(12) United States Patent
Dumortier et al.

(10) Patent No.: US 6,339,791 B1
(45) Date of Patent: Jan. 15, 2002

(54) MULTICAST SHORTCUT ROUTING METHOD

(75) Inventors: Philip Vincent Dumortier, Turnhout; Dirk Ooms, Antwerp; Wim Livens, Reet, all of (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/267,367

(22) Filed: Mar. 15, 1999

(30) Foreign Application Priority Data

Dec. 23, 1998 (EP) .............................. 98403296

(51) Int. Cl.[7] .................. G06F 15/16; G06F 15/173
(52) U.S. Cl. .................. 709/227; 709/238; 370/256; 370/390
(58) Field of Search ................. 370/256, 390; 709/227, 238, 249

(56) References Cited

U.S. PATENT DOCUMENTS

| | | | | |
|---|---|---|---|---|
| 5,903,559 A | * | 5/1999 | Acharya et al. | 370/355 |
| 5,930,259 A | * | 7/1999 | Katusube et al. | 370/409 |
| 6,009,097 A | * | 12/1999 | Han | 370/395 |
| 6,055,561 A | * | 4/2000 | Feldman et al. | 709/200 |
| 6,078,590 A | * | 6/2000 | Farinacci et al. | 370/432 |
| 6,151,633 A | * | 11/2000 | Hurst et al. | 709/235 |
| 6,167,051 A | * | 12/2000 | Nagami et al. | 370/297 |
| 6,275,494 B1 | * | 8/2001 | Endo et al. | 370/395 |

FOREIGN PATENT DOCUMENTS

| WO | 97/28505 | * 8/1997 | G06F/13/14 |
|---|---|---|---|

OTHER PUBLICATIONS

A. Acharya et al, IPSOFACTO: IP Switching Over Fast ATM Cell Transport, Internet Engineering Task Force (IETF), Jul. 1997, pp. 1–11.

* cited by examiner

*Primary Examiner*—Zarni Maung
*Assistant Examiner*—Andrew Caldwell
(74) *Attorney, Agent, or Firm*—Sughrue Mion, PLLC

(57) ABSTRACT

A shortcut routing method is used in an Internet Protocol network over a network. This network, including a plurality of switch-routers and optionally a plurality of routers interconnected by links, is adapted to carry a point-to-multipoint connection between a sending host and a plurality of potential receiving hosts. Each of these receiving hosts is coupled to one of the plurality of routers and/or switch-routers.

A first data-packet of an Internet Protocol packet-flow is broadcasted from the sending host towards all potential receiving hosts and wherein each potential receiving host of these potential receiving hosts may send, upon reception of said first data-packet, a prune-message in direction of said sending host to notify that this potential receiving host does not wish to receive this Internet Protocol packet-flow. This method further includes the step of delaying the set-up of the shortcut path over a predetermined time-interval, which is dependent on the period of time the prune-message needs to reach the plurality of routers and/or switch-routers in the direction of the sending host, which step is followed by the actual setting up of the shortcut path between the sending host and the receiving hosts, those are the potential hosts which didn't send a prune message.

6 Claims, 2 Drawing Sheets

MULTICAST SHORTCUT ROUTING METHOD

BACKGROUND OF THE INVENTION

The present invention relates to a shortcut routing method over an Internet network as described in the preamble of claim 1 and a related device as defined in the preamble of claim 2.

Such a shortcut method, related device and related system are already known in the art, e.g. from the internet draft document "IPSOFACTO: IP Switching over Fast ATM cell transport" from the authors A. Acharya, R. Dighe and F. Ansari, published in July 1997 by Internet Engineering Task Force (IETF). Therein, a method for mapping of IP multicast-flows to ATM connections is described. This method refers to constructing an Internet Protocol multicast distribution tree for each source and the shortcut routing along each of the branches of the constructed tree. This distribution tree, called a point-to-multipoint VC in the referred draft, is a tree from the multicast-source at the root of the tree to all multicast receivers, as leaves of the tree. The distribution tree provides the shortest path from the source to each receiver of the group. It should be noticed that the Internet Protocol hereafter is called IP. The just mentioned tree is constructed and maintained using a "broadcast and prune" technique, where broadcast is called "adding a point-to-multipoint VC entry in the hardware VC routing table", when a source starts to send to a multicast group. This means that the multicast-source sends a broadcast message to each receiver of the group. Each receiver not interested, sends a prune-message in the direction of the sender indicating to be excluded from the multicast-group. In case of an IP-multicast shortcut all tree topology information is copied from OSI layer 3 to OSI layer 2, called "mapping the state to a point-to-multipoint VC within the switching fabric" in the draft. Thus for a broadcast message towards each receiver a shortcut over an ATM shortcut VC is set-up. For each receiver not interested sending back a prune-message the shortcut over the ATM shortcut VC is released, called "deleting a VC from the VC routing tables".

In the current situation, that is the situation as described in the prior art the shortcut path is set-up at a certain moment in time. The receiving host which is not interested indicates this by sending a prune-message. In the end it can be concluded that setting-up the shortcut path towards this receiving host wasn't necessary and superfluously using network resources.

SUMMARY OF THE INVENTION

An object of the present invention is to provide a shortcut routing method of the above known type but which is performed more efficiently and wherein less network resources are used superfluously.

According to the present invention, this object is achieved by the method as described in claim 1 and the device as described in claim 2.

Indeed by delaying the set-up of a shortcut path, while the delay-time is for instance at least the period of time a prune-message, sent by the receiving host, needs to reach the initiating upstream router, it is avoided that shortcut paths are set-up useless. Hence, if the set-up of the shortcut path is delayed till a potential prune-message can be received, no shortcut path is set-up superfluously.

A further characteristic feature of the present invention mentioned in claim 3, is also related to the determination and adaptation of the delay time-interval.

The shortcut router ROU may be able to determine an expiration-time of a prune-message, that is the period of time a prune-message is received by the sending host SH after expiration of the delay-time interval. If the shortcut router ROU receives a number of prune-messages after or before the expiration of the current delay time interval, the delay-time interval can be adopted in order to optimise the establishment of shortcut connections. Based on this expiration-time the shortcut router ROU calculates the measure of extension of the delay time-interval. Another possibility might be the situation that prune messages are received before the expiration of the delay-time. The delay time-interval can be decreased then.

Also an additional feature of the present invention is described in claim 4.

A shortcut router device may be involved in the set-up of more than one shortcut path, one between the sending host and each of the receiving hosts To take, the delay times of each of the parallel shortcut path's branches of the multicast tree wherein the mentioned shortcut router device is involved, into account each shortcut router device includes a delaying means for each path between the sending host and a receiving host.

BRIEF DESCRIPTION OF THE DRAWING

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
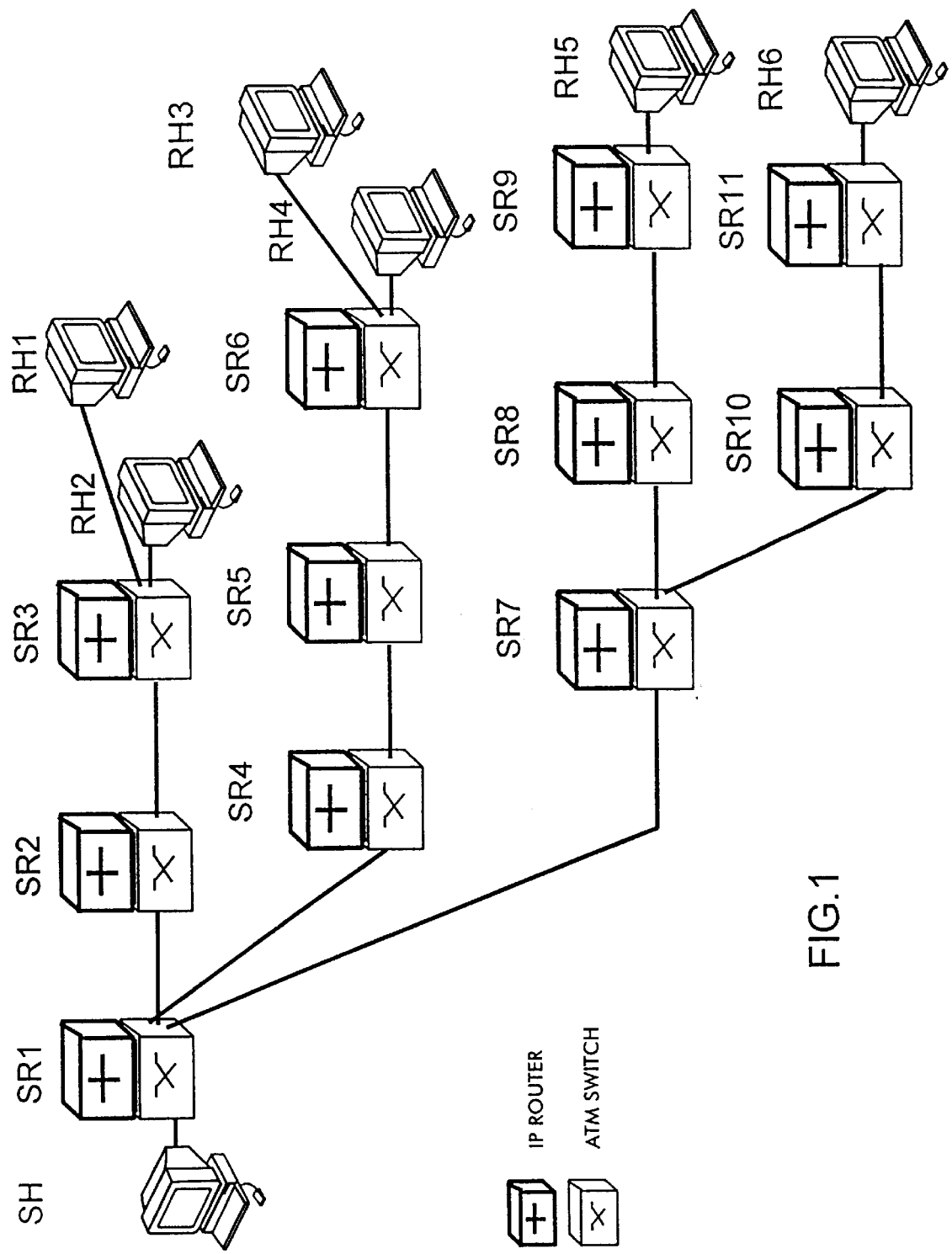
FIG. 1 represents a multicast connection-tree wherein the multicast shortcut is set-up and FIG. 2 which represents the structural built-up of the router, which forms the router of each switch-router SR1–R11 in FIG. 1.

In the following paragraphs, referring to the drawings, the implementation of the method according to the present invention will be described. In the first paragraph of this description the main elements of this multicast shortcut routing system are described. In the second paragraph, all connections between the before mentioned network elements and described means are defined. In the following paragraph the actual execution of the shortcut routing system is described.

The essential elements of the network of the embodiment of the present invention are the shortcut routing devices constituted by switch-router combinations SR1–SR11, a sending host SH and receiving hosts RH1–RH6 as shown in FIG. 1. In this embodiment, these sending and receiving hosts are computer terminals.

Sending host SH is connected via an ATM-link to the switching-part of switch-router SR1. The switching-part of the switch-router SR1 is connected via another ATM-link to the switching-parts of switch-router SR2, switch-router SR4 and switch-router SR7. Switch-router SR2 is connected, via an ATM link, to the switching-part of switch-router SR3, which on its turn is linked to receiving host RH1 and receiving host RH2 via an ATM-link. The switching-part of switch-router SR5 is connected to the switching-part of switch-router SR4 and on the other side to the switching-part of switch-router SR6. The switching-part of switch-routers SR6 is connected to the receiving hosts RH3 and RH4, both via an ATM-link. Then the switching-part of switch-router SR7 is connected to the switching-part of switch-router SR8 and besides this to the switching-part of switch-router SR10. The switching-parts of the respective switch-router SR8 and SR10 are connected to the respective switching-parts of switch-routers SR9 and SR11. The switching-parts of switch-routers SR9 and SR11 are respectively connected to the receiving hosts RH5 and RH6, both via an ATM-link. Each router of switch-router combination SR1–SR11 is connected to the belonging switch via a link between the control-port of the switch and one of the router.

Figure 2:
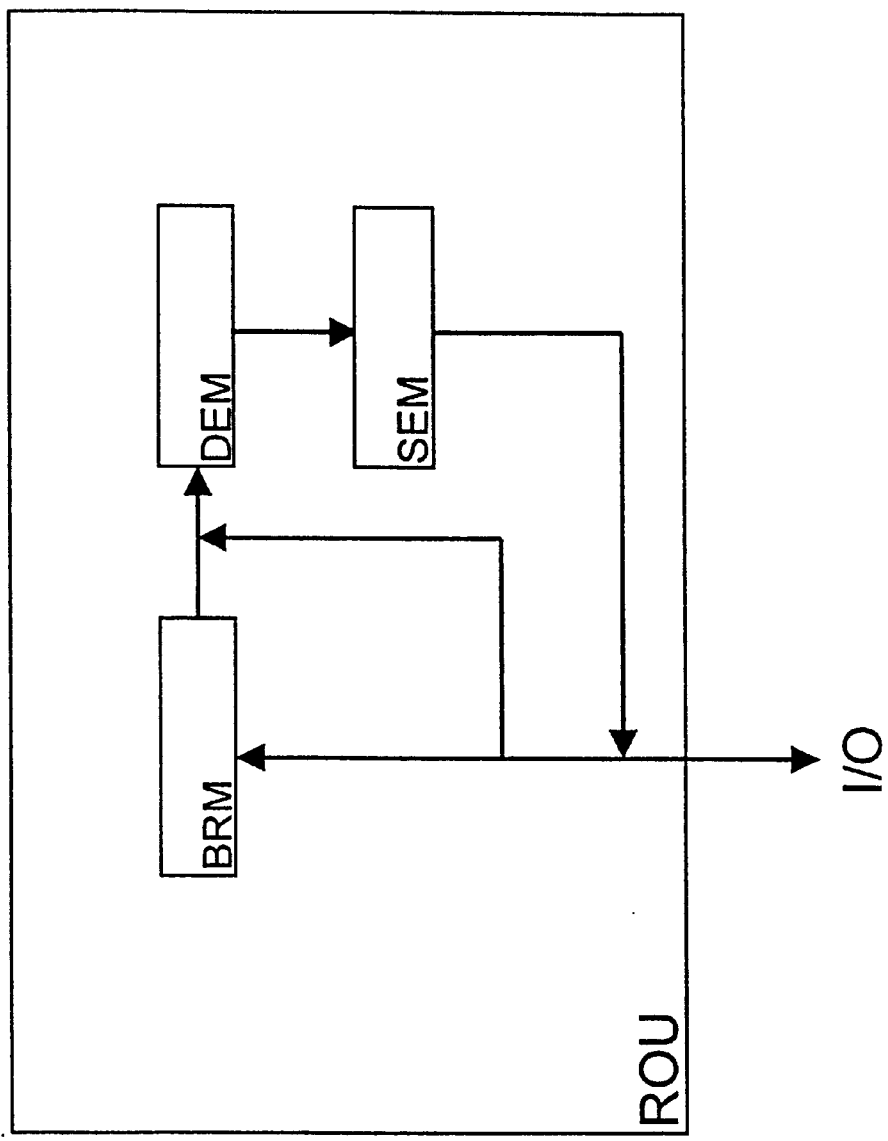

An important network element is the shortcut router ROU, as presented in FIG. 2, which mainly takes care of the routing of data-flows through the network and the establishing of a shortcut-path which is handled in co-operation with the adjacent routers. The main elements of the router ROU are the broadcasting means BRM which takes care of broadcasting data-packets to the next-following downstream adjacent routers ROU, the delaying means DEM which takes care of delaying the establishment of a shortcut-path and the shortcut route establishing means SEM which in co-operation with adjacent routers takes care of the actual establishment of a shortcut path. It should also be noted that each router owns a delaying means DEM for each potential shortcut path wherein that router is involved. It is also assumed that functionality concerning the handling of incoming prune messages is available within the shortcut router ROU as it is within the presently available routers. Here is mainly, the functionality concerning the receiving of a prune message, deciding if this prune message has to be forwarded and the actual forwarding functionality, meant.

The broadcasting means BRM has an input/output-terminal I/O which is also an input/output-terminal of router ROU. The broadcasting means BRM is further coupled to delaying means DEM which on its turn is coupled to the shortcut route establishing means SEM. The shortcut route establishing means SEM has an output-terminal which is also coupled to the input/output terminal I/O of the router ROU. Besides this, the input-terminal of delaying means DEM is also coupled to the input/output-terminal I/O of router ROU.

In order to explain the operation of the present invention it is assumed that sending host SH, intends to send an Internet Protocol data-flow to a user group existing of the receiving hosts RH1–RH6. Thereto the first packet of an Internet protocol data-flow is broadcasted from the sending host via switch-router SR1 in direction of all potential receiving hosts RH1–RH6.

The packets of the data-flow sent by sending host SH contain a special multicast destination-address indicating, the flow should be sent to all potential receiving hosts RH1–RH66. Subsequently, the first data-packet of the flow is initially sent to the broadcasting means BRM of the router belonging to switch-router SR1. The broadcasting means BRM of the router belonging to switch-router SR1 then broadcasts the first data-packet towards the routers belonging to switch-router SR2, SR4 and SR7 and the delay-timer of the delaying means DEM of the router belonging to switch-router SR1 is started. The broadcasting means BRM of these, just mentioned, routers forward the data-packet on its turn, to all adjacent downstream switch-routers, that is towards the respective routers SR3, SR5, SR8, and SR10. The delay timers of delaying means DEM of the routers belonging to these switch-routers are also started. In the same way as before the data-packets are broadcasted towards the receiving hosts RH1–RH6 via the respective remaining switch-routers SR6, SR9 and SR11. In this way the receiving hosts RH1–RH6 are posted a data flow will be sent towards each receiving host of the group.

It is further assumed that the receiving hosts RH2, RH4 and RH6 are not interested in the data-flows sent. To notify the intermediate routers on the respective path's down to switch-router SR1 that these receiving hosts RH2, RH4 and RH6 are not interested in the data-flow to be sent, a prune-message will be sent in direction of switch-router SR1 via the respective adjacent downstream routers of switch-routers SR3, SR6 and SR1.

All routers of intermediate switch-routers SR1–SR11 on their turn expect they may receive a prune-message and therefore, these routers of intermediate switch-routers SR1–SR11 will wait during the delay-time before the shortcut route establishing means SEM are activated.

The prune-messages sent by receiving hosts RH2, RH4 and RH6, in the mean time are passed via the respective routers belonging to switch-routers SR3, SR6 and SR11. By sending these prune-messages the delaying means DEM of the routers of switch-routers SR3, SR6 and SR11 are deactivated and consequently the corresponding shortcut route establishing means SEM are disabled. In this way all, the shortcut route establishing means SEM of the three receiving hosts RH2, RH4 and RH6 are disabled, meaning that no shortcut path will be set-up over the respective links between switch-routers SR3, SR6 and SR11 and the respective receiving host RH2, RH4 and RH6. In case of receiving hosts RH2 and RH4 the routers of switch-routers SR3 and SR6 do not further pass the prune-message in direction of switch-router SR1 because the other, receiving hosts RH1 and RH3 do want to receive the internet protocol packet-flow and wherebetween consequently a shortcut path has to be set-up . In this way, no shortcut path will be set-up towards the receiving hosts RH2 and RH4.

In case of receiving host RH6, the router belonging to switch-router SR11 further forwards the prune-message towards the router belonging to switch-router SR10.

The delaying means DEM of the router of switch-routers SR10 is also deactivated and consequently the corresponding shortcut route establishing means SEM is disabled. Then the prune-message is forwarded further to the router belonging to switch-router SR7. The prune-message is received here, the corresponding delay-timer DEM is deactivated and consequently the corresponding shortcut route establishing means SEM is disabled.

The router of switch-router SR7 decides not to forward the prune-message because receiving host RH5 does want to receive the internet protocol packet flow and consequently, over the link between switch-routers SR1 and SR7, a shortcut needs to be set-up.

If any of the delaying means DEM of the router belonging to the intermediate switch-routers SR1–SR11 do not receive a prune-message, which in this embodiment is the situation for the routers belonging to switch-routers on the path's between sending host SH and the receiving hosts RH1, RH3 and RH5, the shortcut route establishing means SEM of the router of each switch-routers on each of these branches in co-operation with the other switch-routers within these branches, establish a shortcut path towards the destinations, the receiving hosts RH1, RH3 and RH5. These receiving hosts will receive the Internet Protocol packet-flow sent by the sending host SH.

It is also possible to enable the delaying means DEM to measure the prune-message expiration-time interval. The prune-message expiration-time interval is the time interval that a prune-message is received after the expiration of the delay-time interval. Based on the mean value of the prune-message expiration time-interval of a number of prune-messages, the delay-time interval is adapted. Suppose the mean value of the prune-message expiration-time interval is has the value $T_{mean}$. This value, $T_{mean}$, can be positive: the prune-message comes in after expiration of the delay-time interval or negative: the prune-message comes in before expiration of the delay-time interval. The delay-time interval is then adapted by adding the mean value of the prune-message expiration time-interval to the actual delay-time-interval.

Although the above embodiment of the invention has been described by means of functional blocks, their detailed realisation based on this functional description should be obvious for a person skilled in the art and is therefore not described.

While the principles of the invention have been described above in connection with specific apparatus, it is to be clearly understood that this description is made only by way of example and not as a limitation on the scope of the invention, as defined in the appended claims.

What is claimed is:

1. Multicast shortcut routing method, to be used in an Internet Protocol network over a network including a plurality of switch-routers (SR1–SR11) interconnected by links, adapted to carry a point-to-multipoint connection between a sending host (SH) and a plurality of receiving hosts (RH1–RH6), each coupled to one of said plurality of switch-routers, wherein a first data-packet of an Internet Protocol packet-flow is broadcasted from said sending host (SH) towards all potential receiving hosts (RH1–RH6) and wherein each potential receiving host (RH1–RH6) of said potential receiving hosts (RH1–RH6) may send, upon reception of said first data-packet, a prune-message in direction of said sending host (SH) to notify that said potential receiving host does not wish to receive said Internet Protocol packet-flow, said method further including the step of setting up a shortcut path for said point-to-multipoint connection, for said Internet Protocol packet flow, by said plurality of switch-routers, characterised in that before said step of setting up a shortcut path, said method includes the step of, delaying sad setting-up of said shortcut path over a predetermined time-interval which is dependent on the period of time said prune-message needs to reach said plurality of switch-routers in direction of said sending host.

2. The multicast shortcut routing method according to claim 1, said network further comprising a plurality of routers interconnected by said links.

3. A multicast shortcut router device (ROU) enabled to transfer Internet Protocol packet flows over a network including a plurality of switch-routers (SR1–SR11) interconnected by links, adapted to carry a point-to-multipoint connection, between a sending host (SH) and a plurality of receiving hosts (RH1–RH6), each coupled to one of said plurality of switch-routers, said shortcut router device (ROU) comprising a broadcasting means (BRM), adapted to broadcast a first data-packet of an Internet Protocol packet-flow from said sending host towards all potential receiving hosts, to thereby allow each potential receiving host of said potential receiving hosts (RH1–RH6) to notify, via a prune message, that said potential receiving host does not wish to receive said Internet Protocol packet-flow and said shortcut router device (ROU) further comprises a shortcut route establishing means (SEM), adapted to set-up a shortcut path for said point-to-multipoint connection, for said Internet Protocol packet flow by the shortcut router device of said switch-router, characterised in that said shortcut router device (ROU) further includes a delaying means (DEM) adapted to delay said setup of said shortcut path over a predetermined time-interval which is dependent on the period of time, said prune-message sent by the receiving host needs to reach said shortcut router device involved in said connection set-up.

4. A shortcut router device (ROU) according to claim 3, characterised in that said delaying means (DEM) is adapted to dynamically determine and adapt the duration of said time-interval based on a delay of a received prune-message after expiration of said timer-interval at said shortcut router device involved in said connection set-up.

5. A shortcut router device (ROU) according to claim 3, characterised in that said shortcut router device (ROU) comprises at least one delaying means (DEM), one of said at least one delaying means for each branch set-up wherein said shortcut router device is involved, being adapted to delay said set-up of said corresponding shortcut path over said predetermined time-interval.

6. The shortcut router device (ROU) according to claim 3, said network further comprising a plurality of routers interconnected by said links.

* * * * *